Aug. 13, 1940.　　　L. A. WOODS　　　2,211,223
EXCAVATOR AND PIPE LAYER
Filed July 11, 1939　　　2 Sheets-Sheet 1
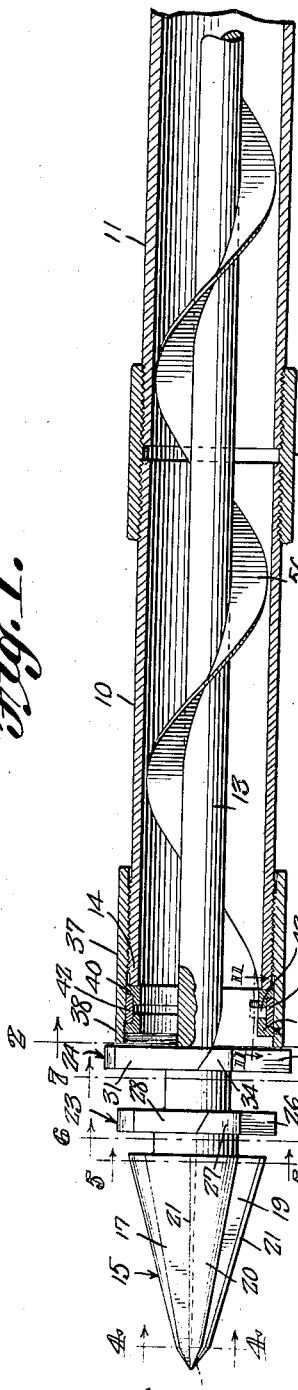
Lawrence A. Woods,
INVENTOR
BY Victor J. Evans & Co.
ATTORNEYS

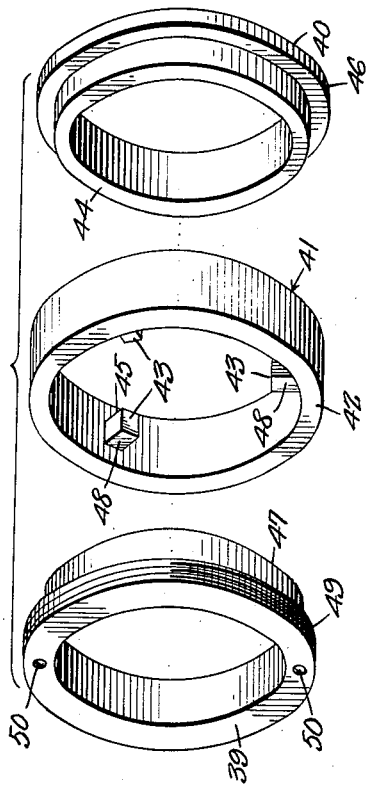

Patented Aug. 13, 1940

2,211,223

UNITED STATES PATENT OFFICE 2,211,223

EXCAVATOR AND PIPE LAYER

Lawrence Alvyn Woods, Venice, Calif.

Application July 11, 1939, Serial No. 283,875

9 Claims. (Cl. 255—20)

My invention relates to new and useful improvements in pipe layers.

An important object of my invention is to provide a pipe layer having means incorporated therewith to excavate an opening of substantially larger size than the pipe and having means to convey the detritus through the pipe to permit it to be disposed of in a convenient and expeditious manner.

Another object of my invention is to provide a pipe layer wherein the excavated opening may be progressively enlarged thus facilitating the forming of the same and substantially reducing the power necessary to rotate the cutters.

Still another object of my invention is to provide a pipe layer of the above-mentioned character having a substantially frictionless bearing at the forward end of the pipe sections to hold the cutting bit in a properly aligned position.

Yet another object of my invention is the provision of a pipe layer of the above-mentioned character that is particularly adapted to the side tapping of springs, horizontal, oblique or vertical drilling for prospecting test holes, laying of underground conduits for telegraph or telephone cables, electric lines, and the like, the laying of underground pipe lines adapted to carry gas or liquid, and many other operations of a similar nature.

A further object of my invention is to provide a pipe layer that is simple in construction, inexpensive to manufacture, and efficient and efficacious in the performance of its duties.

Other objects and advantages of my invention will be apparent during the course of the following description.

In the drawings, forming a part of this specification, and in which like numerals are employed to designate like parts throughout the same, Figure 1 is a longitudinal sectional view of a device embodying my invention, and showing the same associated with pipe sections, Figure 1—a is a fragmentry longitudinal sectional view illustrating the manner in which additional sections may be added to the device to lengthen the same, Figure 2 is a vertical sectional view taken on the line 2—2 of Figure 1, Figure 3 is an exploded perspective view of a race embodying a part of my invention, Figure 4 is a vertical sectional view taken on the line 4—4 of Figure 1, Figure 5 is a vertical sectional view taken on the line 5—5 of Figure 1, Figure 6 is a vertical sectional view taken on the line 6—6 of Figure 1, Figure 7 is a vertical sectional view taken on the line 7—7 of Figure 1, Figure 8 is a fragmentary view, partly in section and partly in elevation, and illustrating the manner in which the sections of the conveyer are coupled together, Figure 9 is a vertical sectional view taken on the line 9—9 of Figure 8, Figure 10 is a fragmentary view showing parts in section and parts in elevation illustrating another way in which sections of the conveyer may be coupled together, and Figure 11 is a transverse sectional view taken on the line 11—11 of Figure 1.

In the accompanying drawings, wherein for the purpose of illustration, is shown a preferred embodiment of my invention, the numerals 10 and 11 designate pipe sections joined together by the conventional coupling 12. The arbor 13 is positioned axially within the sections 10 and 11 and projects substantially beyond the free end 14 of the section 10. The extremity of the portion of the arbor extending beyond the end of the pipe sections is formed with a reaming bit 15 having a four-edged cutting tip 16 which develop into radial cutting blades 17, 18, 19, and 20. Each of the blades 17, 18, 19, and 20 is formed with a laterally disposed cutting edge 21 adapted to bite into the mold as the reamer 15 is rotated and to convey the detritus along the valleys 22 defined by the blades toward the pipe section 10.

Reaming cutters 23 and 24 are formed on the shank rearwardly of the reamer 15 and spaced therefrom and from each other. The reaming cutter 23 is formed with radially disposed cutting arms or blades 25, 26, 27, and 28 having the angularly disposed cutting ends 29. The cutting ends 29 of the arms 25, 26, 27, and 28 are disposed a greater distance from the center of the arbor 18 than the blades 17, 18, 19, and 20 of the reamer 15, and as the reamer 15 progresses into the ground, the cutting reamer 23 will enlarge the opening formed thereby. The valleys 30 defined by the arms of the cutting reamer 23 are contiguous with the periphery of the hub 15' of the reamer 15 in a manner whereby the arms 25, 26, 27, and 28 will not offer any appreciable resistance to the rearward flow of the detritus. The cutting reamer 24, spaced rearwardly of the reamer 23, is formed with radially disposed cutting arms 31, 32, 33, and 34 having angular cutting ends 35. The arms of the reaming cutters 24 are substantially longer than the arms of the cutting reamer 23 in a manner to enlarge the opening made by the reamer 15 and cutting reamer 23. The valleys 36 defined by the arms 31, 32, 33, and 34 are contiguous with the periphery of the arbor so that the cutter 24 will not impede the rearward movement of the detritus gathered by the reamer 15 and cutting reamer 23.

The cutting reamer 24 is positioned a substantial distance forwardly of the end 14 of the pipe section 10; the coupling 37 is threadedly mounted on the end and with the end 38 thereof projecting forwardly of the section and terminating adjacent the cutting reamer 24. The end 38 of the coupling 37 is internally screw threaded to threadedly receive the retaining ring 39 which cooperates with the retaining ring 40 to hold the race 41 therebetween. The race 41 comprises an annular ring 42 having equi-spaced radially disposed studs 43 projecting from the inner periphery thereof. The ring 40 is adapted to be slidably received by the race 41 and with the edge 44 thereof in abutting relation with the side 45 of the studs 43. The annular flange 46 of the ring 40 engages the inner periphery of the coupling 37 and is disposed in abutting relation with the end 14 of the pipe section 10. The retaining sleeve 39 is adapted to be received by the race 41 and with the edge 47 thereof in abutting relation with the sides 48 of the studs 43. The periphery of the annular flange 49 of the retaining ring is screw threaded to threadedly engage the sleeve 37 to hold the collar 40 in abutting relation with the pipe section 10 and the race 41 against displacement therebetween. The outer side of the retaining ring 39 is provided with diametrically opposed indentations 58 adapted to receive the prongs of a tool to permit the sleeve to be rotated from engagement with the coupling 18 to permit the removal or renewal of the race 41.

The portion of the arbor 13 intermediate the cutting reamer 24 and the end 14 of the pipe 10 is formed with equi-spaced, radially projecting, helically disposed fins 51, 52, and 53, the outer edges of which are formed with slots 54 which accommodate the studs 43 of the race 41. The studs will be prevented from becoming disengaged from the fins upon rotation of the arbor 13 by reason of the angular positioning of the fins relative thereto, as clearly illustrated in Figure 11. The ends of the studs 43 bear against the inner ends of the slots 54 to hold the edges of the fins spaced slightly from the periphery of the retaining rings 39 and 40, and the forward ends of the fins are formed with depending prongs 55 the edges of which are spaced slightly from the inner periphery of the coupling 37. The coupling is provided with an oil port 57 through which a suitable grease may be introduced to lubricate the race 41 and a filler plug 58 is normally disposed therein to prevent debris from gaining access thereto. The arbor 13 carries a continuous helical web 56 which terminates at the end 14 of the pipe section 10. The detritus moved towards the pipe section by the reamer 15 and reamer cutters 23 and 24 is received by the fins 51, 52, and 53 which, by virtue of their helical formation, will move the same into the helical web 56 where it will be conveyed through the pipe sections 10 and 11 to the far end thereof.

It is often necessary to run a pipe line underneath the ground, and conditions are often such that it is impossible or extremely inconvenient to dig a ditch from the surface of the ground to the requisite depth to receive the pipe. The present device will permit the pipe to be pushed through the ground either horizontally, obliquely, or vertically. The size of the pipe line will be limited only by the size of the power unit available to drive the arbor and to push the pipe sections forwardly as the mold is excavated by the reamer and reamer cutters. Likewise the straight line distance is only determined by the amount of power developed at the power unit.

The coupling 37 is attached to the end of the first pipe section, here identified by the numeral 10, to hold the cutting end of the arbor 13 positioned as illustrated in Figure 1. When the end 16 of the reamer 15 is pressed into the wall of earth with the section 10 in alignment therewith, and rotation imparted to the arbor 13, the reamer will bite into the earth and move the detritus rearwardly thereof and into the pipe section where the helical web 56 will carry it through to the open end of the said section. The cutting reamers 23 and 24 will enlarge the opening made by the reamer 15, and it will be noted that the arms 31, 32, 33, and 34 of the cutting reamer 24 extend beyond the outer periphery of the pipe sections so that the opening will be of substantially greater diameter than the pipe sections. As the detritus is moved through the pipe sections, the sections may be pushed into the passage formed by the cutting reamers. It will be noted that the fins 51, 52, and 53 will support the arbor coaxially within the pipe sections 10, that the tip 16 of the reamer 15 will be held in a properly aligned position, and that the race 41 will offer no substantial resistance to the rotation of the arbor.

The rearward end of the arbor 13 is formed with an enlarged head portion 59 having with an axial screw threaded shank 60 which is provided with a central substantially square cul-de-sac 61. The companion arbor 62 is formed with a substantially square head 63 adapted to be received within the cul-de-sac 61 and to cooperate therewith in preventing independent rotation of the arbors 13 and 62. An internally screw threaded sleeve 64 is slidably mounted on the arbor 62 and adapted to threadedly receive the shank 60 and to abuttingly engage the shoulder 65, defined by the head 63, to hold the head within the cul-de-sac 61 and to prevent longitudinal displacement of the said arbors. The head 59 of the arbor 13 is provided with a diametrically disposed bore 66 into which a suitable tool may be fitted to prevent rotation of the arbor 13 when the sleeve 64 is being threaded on the shank 60. Both ends of the arbor 62 are provided with square head portions 63 and in the event that an additional section is required, the section 62' may be added thereto. The coupling 67 is provided with central square cul-de-sacs 68 and 69 at either end thereof which are adapted to receive the square head portions 63 and 63' of the arbor 62 and 62', and either extremity thereof is externally screw threaded to receive the sleeves 64 and 64' which abut the heads 63 and 63' to hold the same securely positioned within the cul-de-sac. The coupling 67 is provided with a diametrically disposed bore 70 at substantially the middle thereof in which a suitable tool may be positioned while the sleeves 64 and 64' are being threaded on the coupling.

The arbors 62 and 62' are provided with continuous helical webs 71 and 71'. The web 71 is adapted to abut the extremities of the web 56 on the arbor 62 when the arbor 62 is connected to the arbor 13, and the web 71' is adapted to abut the free end of the web 71 when the arbor 62' is connected to the arbor 62.

It may thus be seen that additional sections of the screw conveyers within the pipe sections may be added as additional pipe sections are connected to the sections 10 and 11, and that the detritus within the pipe sections will be moved by the webs to the free or operating end thereof.

Thrust that has been borne by the arbor that drives the reamer, in tools heretofore employed, is borne by the pipe sections in the operation of the present device.

This thrust is transferred from the pipe sections through the race 41 of the bearing for the arbor, to the reamer, thus avoiding a considerable amount of strain upon the arbor 13. Greater strength is obtained by using the pipe sections for carrying the thrust, than by using the arbor.

Power is applied by any suitable means to the pipe sections 10, 11, to effect forward movement of the pipe sections and thereby to effect forward movement of the reamer 15. Rotation of the reamer is effected by rotating the arbor by any suitable power means.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A boring device of the character described comprising the combination of a tube, a relatively rotary arbor in the tube, a bearing rotatively supported by the tube, means in the tube supporting the arbor in the bearing, and a reamer connected to be rotated by the arbor and arranged to receive forward thrust of the tube through the intermediary of the bearing.

2. A boring device of the character described comprising the combination of a tube, a relatively rotary arbor in the tube, a support rotatively supporting the arbor in the tube, the tube having an abutment limiting inward movement of the support within the tube, means having a threaded connection with the tube and clamping the support in the tube opposite the abutment, the support being arranged to transfer lengthwise movement of the tube to the arbor, and a reamer connected to be rotated by the arbor and to receive lengthwise movements of the arbor.

3. A boring device of the character described comprising the combination of a tube, a relatively rotary arbor in the tube, a support rotatively supporting the arbor in the tube, the tube having an abutment limiting inward movement of the support within the tube, a floating bearing member between the support and the abutment, means having a threaded connection with the tube and clamping the support opposite the abutment and thereby maintaining the floating bearing member in position, the support being arranged to transfer lengthwise movement of the tube to the arbor, and a reamer connected to be rotated by the arbor and to receive lengthwise movements of the arbor.

4. A boring device of the character described comprising the combination of a tube, a relatively rotary arbor in the tube, a bearing wholly contained within the tube and arranged to rotatively support the arbor in the tube, the bearing being also arranged to receive longitudinal thrust of the tube and to transmit such thrust to the arbor, and a reamer on the arbor disposed to be moved longitudinally by the thrust of the arbor received from the tube.

5. A boring device of the character described comprising the combination of a tube, a relatively rotary arbor in the tube, a support rotatively supporting the arbor in the tube, the support having relatively movable elements, one of the elements being mounted upon the arbor and rotatively supporting the arbor in the tube, another element having a threaded connection with the tube and engaging the element mounted on the arbor, to transfer lengthwise movement of the tube to the arbor, and a reamer connected to be rotated by the arbor.

6. In a boring device having a reamer, the combination of a tube, a helical web rotatively supported in the tube and arranged to feed rearwardly in the tube detritus dislodged by the reamer, the reamer being mounted on the web at an end thereof, and an element disposed to receive forward thrust of the tube and engaging the web to transfer that thrust to the reamer through the web while permitting rotation of the web.

7. A boring device of the character described comprising the combination of a tube, a relatively rotary arbor in the tube, a helical web on the arbor, an element of a bearing abutting an end of the tube, to receive forward thrust of the tube, another element of the bearing rotatively supporting the web in the tube, the latter element being arranged to receive the thrusts from the first-mentioned element and to transfer same to the web, a third element of the bearing arranged on the tube to transfer longitudinal movement of the tube to the web through the bearing, upon withdrawing the tube, and a reamer connected to be rotated by the arbor.

8. A boring device of the character described comprising the combination of a tube, a relatively rotary arbor in the tube, a bearing in the tube, spokes in the tube rotatively supporting the arbor upon the bearing, and a helical web on the arbor, the spokes being arranged to feed detritus to the web.

9. A boring device of the character described comprising the combination of a tube, a relatively rotary arbor in the tube, a bearing having a race in the tube, spokes rotatively supporting the arbor upon the race, a helical web on the arbor, the spokes having cupped members ahead of the bearing and the feed end of the tube, to scoop up detritus and feed same to the helical web.

LAWRENCE ALVYN WOODS.